(12) United States Patent
Bell et al.

(10) Patent No.: US 9,975,254 B2
(45) Date of Patent: May 22, 2018

(54) RIGID MAGNETIC TAG LINE SAFETY TOOL

(71) Applicants: Adam Zane Bell, Desert Hills, AZ (US); Mark Anthony Cole, Phoenix, AZ (US)

(72) Inventors: Adam Zane Bell, Desert Hills, AZ (US); Mark Anthony Cole, Phoenix, AZ (US)

( * ) Notice: Subject to any disclaimer, the term of this patent is extended or adjusted under 35 U.S.C. 154(b) by 0 days. days.

(21) Appl. No.: 15/380,180

(22) Filed: Dec. 15, 2016

(65) Prior Publication Data

US 2017/0165846 A1    Jun. 15, 2017

Related U.S. Application Data

(60) Provisional application No. 62/267,481, filed on Dec. 15, 2015.

(51) Int. Cl.
| | |
|---|---|
| *B25J 15/06* | (2006.01) |
| *H01F 7/02* | (2006.01) |
| *B25J 1/04* | (2006.01) |

(52) U.S. Cl.
CPC ............. *B25J 15/0608* (2013.01); *B25J 1/04* (2013.01); *H01F 7/0257* (2013.01)

(58) Field of Classification Search
CPC .......... B25J 1/04; B25J 15/0608; A47F 13/06; A47L 13/41; H01F 7/0257
USPC ................................................ 294/190, 65.5
See application file for complete search history.

(56) References Cited

U.S. PATENT DOCUMENTS

| | | | | |
|---|---|---|---|---|
| 2,654,480 A | * | 10/1953 | Stem ....................... | A47L 13/41 15/3 |
| 2,947,563 A | * | 8/1960 | Stitt ........................ | A47L 13/41 294/65.5 |
| 3,582,123 A | * | 6/1971 | Kyser .................... | H01F 7/0257 16/337 |
| 4,802,702 A | * | 2/1989 | Bownds .................. | A47L 13/41 294/210 |
| 5,166,654 A | * | 11/1992 | Doyelle .................... | B66C 1/04 335/288 |
| 5,382,935 A | * | 1/1995 | Doyelle .................... | B66C 1/04 335/288 |
| 5,395,148 A | * | 3/1995 | Jameson ................. | B03C 1/284 209/215 |
| 5,435,613 A | * | 7/1995 | Jung ..................... | B23Q 3/1546 294/65.5 |
| 6,113,169 A | * | 9/2000 | Gohman ................... | B03C 1/30 209/215 |

(Continued)

*Primary Examiner* — Dean J Kramer

(57) ABSTRACT

A rigid magnetic tag line safety tool is an apparatus that allows a user to guide and connect to a steel plate as it is placed onto or removed from a trench. The rigid magnetic tag line safety tool includes a handle bar, an electrically insulative shaft, a universal joint, a stator, and a magnetized rotor. The handle bar allows a user to grip the apparatus. The handle bar is positioned perpendicular to the electrically insulative shaft and is mounted adjacent to the first shaft end. The electrically insulative shaft distances the user from the steel plate. The stator is pivotably mounted to the second shaft end by the universal joint such that the present invention is not hindered by the varied path of a steel plate being positioned onto or removed from a trench. The magnetized rotor is rotatably mounted to the stator and attaches to the steel plate.

18 Claims, 6 Drawing Sheets

(56) References Cited

U.S. PATENT DOCUMENTS

| | | | | |
|---|---|---|---|---|
| 6,124,777 A | * | 9/2000 | Snider | H01F 13/003 294/65.5 |
| 6,669,024 B2 | * | 12/2003 | Ottens | A47L 13/41 209/215 |
| 2003/0209472 A1 | * | 11/2003 | Hsiao | A47L 13/41 209/215 |

* cited by examiner

RIGID MAGNETIC TAG LINE SAFETY TOOL

The current application claims priority to U.S. provisional application Ser. No. 62/276,481 filed on Dec. 15, 2015.

FIELD OF THE INVENTION

The present invention relates generally to a construction safety tool. More specifically, the present invention is a rigid magnetic tag line safety tool that aids in the maneuvering and control of steel plates and other large or heavy steel objects.

BACKGROUND OF THE INVENTION

When a trench is dug into a street for wet or dry utilities installation, repair, expansion or upgrades, large, heavy and dangerous steel plates are used to cover the trench when work is not being performed within the trench. Placing steel plates on top of trenches prevents people, animals, and vehicles from danger or from falling into the trench. The steel plates secure any completed work or in progress utilities work. Steel plates are generally large and heavy, making the daily removal and replacement of the steel plates onto and off of trenches difficult, tiresome and dangerous work. Typically, steel plates are moved into and out of position by using a heavy-duty chain sling and a large backhoe or excavator.

It is widely known and accepted by companies who work with large, heavy steel plates that being anywhere near a hoisted or maneuvering steel plate is dangerous and can result in serious injury or death if a mistake is made or equipment fails. There are many reports found in the Occupational Safety and Health Administration (OSHA) accident database that describe numerous serious or even fatal injuries that have occurred while working with or near steel plates. The majority of work sites still use old and dangerous practices of having workers hold or use their feet to stabilize the steel plates while being lifted onto or off of a trench. These very risky and dangerous methods unnecessarily put workers at risk of serious injury or death and expose companies to large hospital bills, legal fees, increased insurance premiums, costly delays and degraded safety ratings.

Current problem areas include injuries and electrical shock risk. Injuries include but are not limited to smashed feet or toes, amputation, broken legs, and other similar injuries. Electrical shock risk is a potential hazard which could result from the installation and maintenance of underground utilities such as electrical wires. Electrical shock is also a potential hazard when heavy equipment is positioned near aerial high voltage power lines or in other electric utilities work.

It is therefore an objective of the present invention to introduce a rigid magnetic tag line safety tool. The present invention functions to solve the aforementioned problems by providing a worker with a tool that allows for complete control and stabilization of steel plates and other heavy steel objects being maneuvered by heavy equipment. The present invention does so while keeping said worker at a safe distance from the steel plate or heavy steel object. Use of the device functions to improve safety, reduce injuries, improve efficiency, reduce equipment damage, provide better insulation against electrical shock, and distance the user from hazardous steel objects being maneuvered into or out of position. Overall, the present invention is lightweight, durable, safer, and easy to use.

DETAILED DESCRIPTION OF THE INVENTION

All illustrations of the drawings are for the purpose of describing selected versions of the present invention and are not intended to limit the scope of the present invention.

Figure 1:
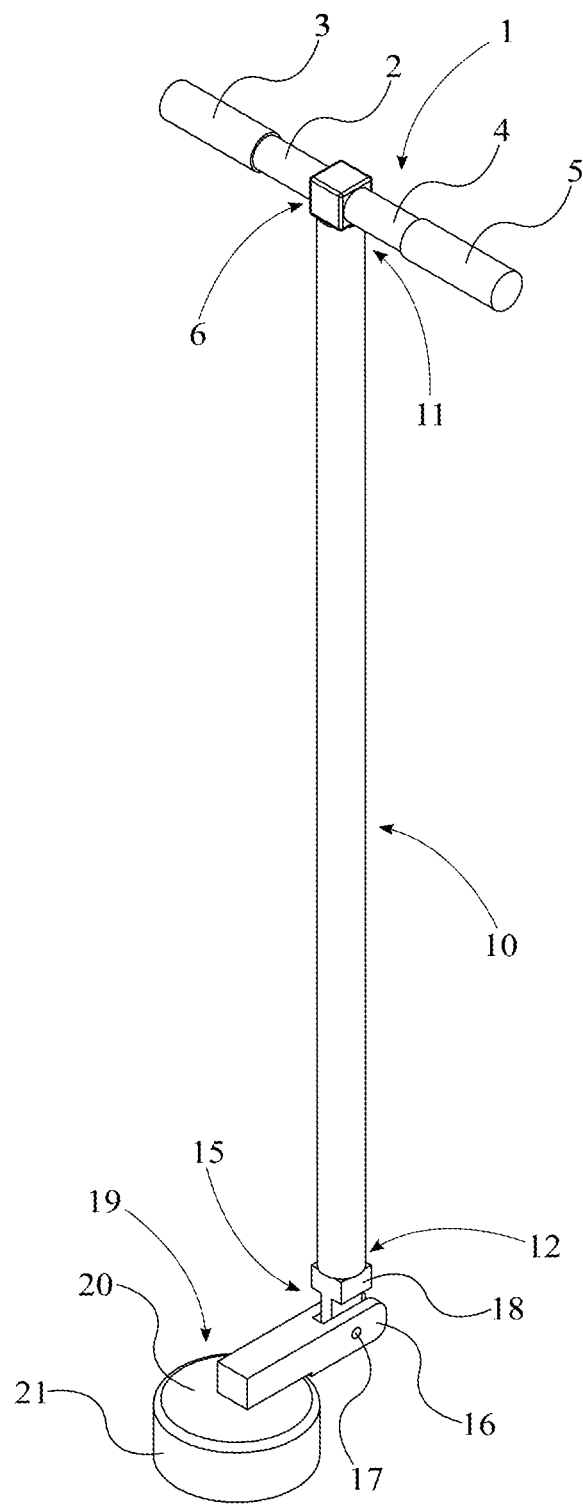
FIG. 1 is a perspective view of the preferred embodiment of the present invention in an upright orientation, wherein the electrically insulative shaft is a single continuous shaft in the preferred embodiment.

The present invention maneuvers a steel plate without being fastened to the steel plate. Before a steel plate is maneuvered onto or off of a trench, the present invention attaches to the steel plate, and a user guides the movement of the steel plate with the present invention. The present invention effectively adheres to a steel plate while allowing the user to quickly and safely detach himself or herself in the event of an emergency. The present invention does not separate from the steel plate as the user engages and guides the steel plate onto or off of the trench regardless of the path of the steel plate. In reference to FIG. 1, FIG. 4, FIG. 2, and FIG. 5, the present invention comprises a handle bar 1, an electrically insulative shaft 10, a universal joint 15, a stator 19, and a magnetized rotor 22. The handle bar 1 allows a user to control the movement of a steel plate via the present invention as the user grips the handle bar 1. The preferred embodiment of the handle bar 1 is a T-shaped handle bar as shown in FIG. 1. The electrically insulative shaft 10 allows a user to maneuver the steel plate while remaining a safe distance away from the steel plate and prevents an electric current from reaching the user via the present invention. The universal joint 15 pivots the electrically insulative shaft 10, and consequently the handle bar 1, so that the present invention remains attached to the steel plate throughout the movement of the steel plate onto the trench. The stator 19 attaches the magnetized rotor 22 to the universal joint 15. The magnetized rotor 22 attaches the present invention onto the steel plate.

Figure 2:
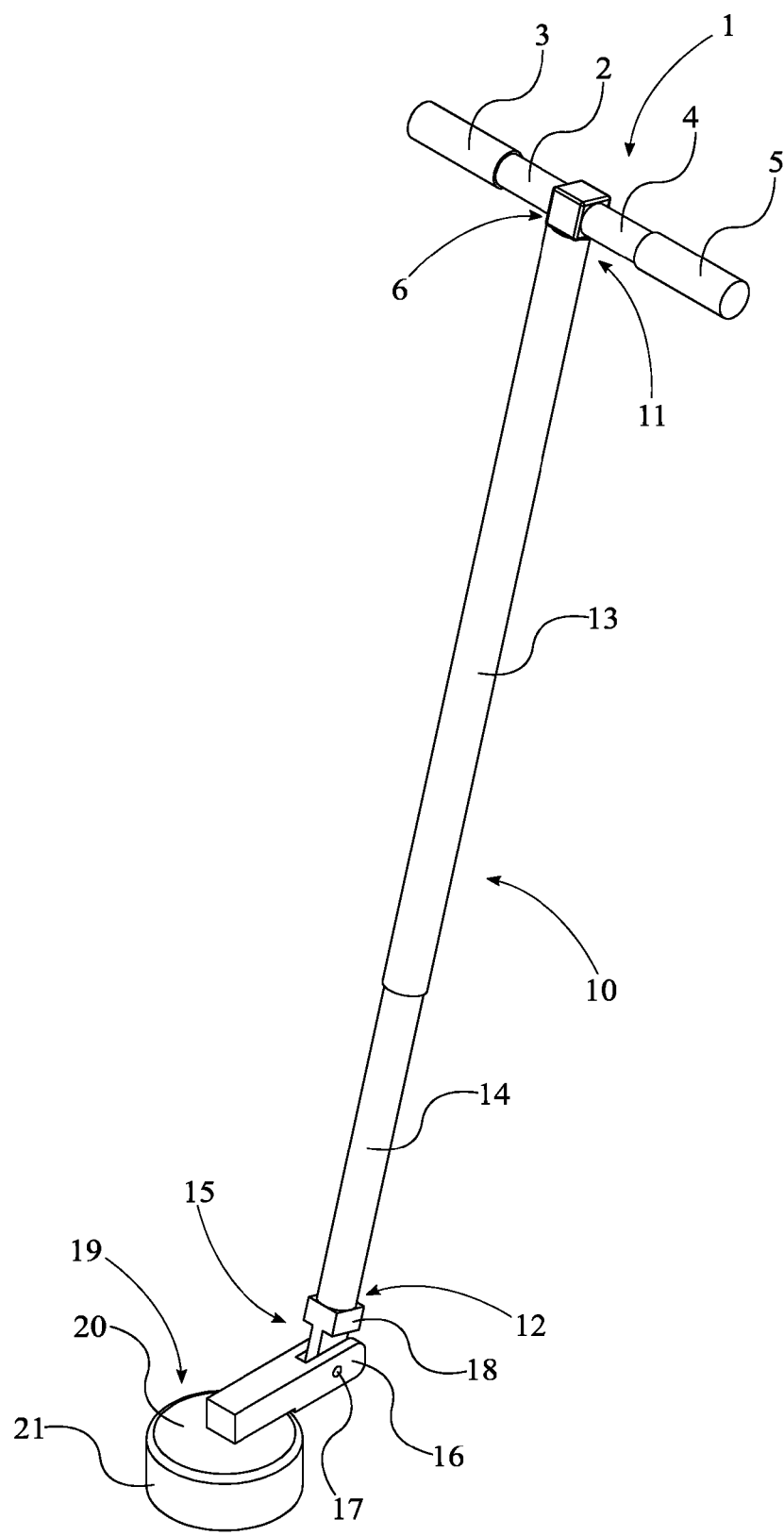
FIG. 2 is a perspective view an alternate embodiment of the present invention in a tilted orientation, wherein the electrically insulative shaft comprises a first shaft member and a second shaft member.

The overall configuration of the aforementioned components allows a user to guide a steel plate onto or off of a trench throughout the path of the steel plate. The electrically insulative shaft 10 further comprises a first shaft end 11 and a second shaft end 12. The first shaft end 11 and the second shaft end 12 are positioned opposite each other along the electrically insulative shaft 10 as seen in FIG. 1 and FIG. 2. The handle bar 1 is positioned perpendicular to the electrically insulative shaft 10 so that the user may completely grip the handle bar 1 as the electrically insulative shaft 10 moves according to the position of the steel plate. More specifically, the handle bar 1 is mounted adjacent to the first shaft end 11 so that there is a safe distance between the steel plate and the user. The stator 19 is pivotably mounted to the second shaft end 12 by the universal joint 15, which allows the magnetized rotor 22 to pivot in relation to the electrically insulative shaft 10 while being attached to the steel plate, thereby allowing the steel plate that is attached to the magnetized rotor 22 to move in a variety of directions. Furthermore, the magnetized rotor 22 is rotatably mounted to the stator 19 so that which allows the magnetized rotor 22 to rotate.

Figure 6:
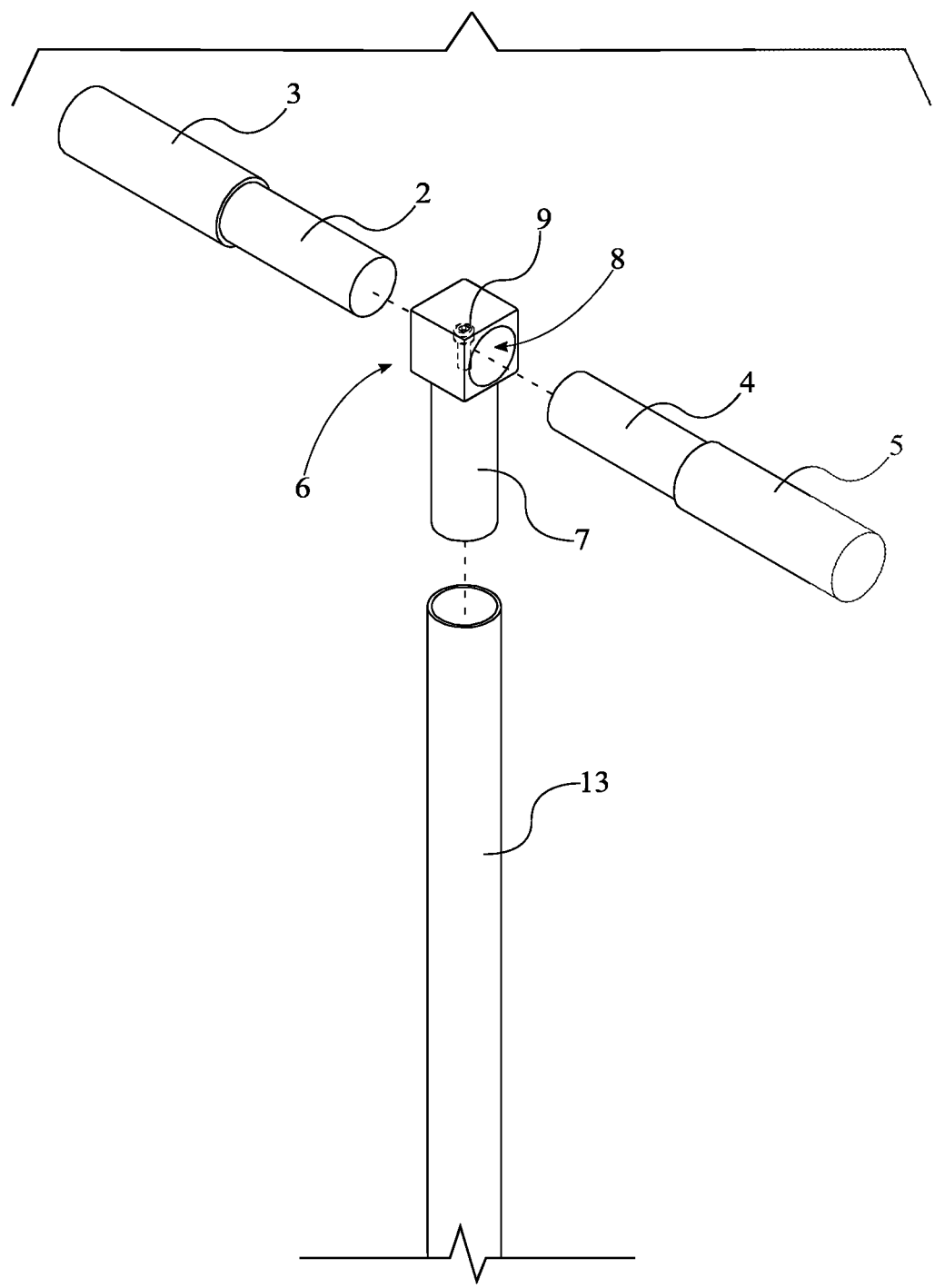
FIG. 6 is an exploded view of the handle bar, the bar adapter, and the electrically insulative shaft of the present invention.

In the preferred embodiment of the present invention, a bar adapter 6 connects the handle bar 1 to the electrically insulative shaft 10. The bar adapter 6 is detachably attached to the first shaft end 11 so that the handle bar 1 may be replaced or interchanged with another. More specifically, the handle bar 1 is centrally mounted through the bar adapter 6. This arrangement stabilizes the grip of the user about the electrically insulative shaft 10. The bar adapter 6 comprises a cylindrical body 7, a bar hole 8, and a fastener 9. The cylindrical body 7 mounts the bar adapter 6 onto the electrically insulative shaft 10. The bar hole 8 houses the handle bar 1. The configuration of the cylindrical body 7, the bar hole 8, and the fastener 9 is such that the bar hole 8 laterally traverses through the cylindrical body 7, as seen in FIG. 6, and the handle bar 1 is positioned through the bar hole 8. This configuration maintains the perpendicular orientation between the handle bar 1 and the electrically insulative shaft 10. Both the handle bar 1 and the cylindrical body 7 is fixed to the first shaft end 11 of the electrically insulative shaft 10 by the fastener 9. In an alternate embodiment of the present invention, the handle bar 1 is rotatably mounted adjacent to the first shaft end 11, further accommodating the varied paths of the steel plate onto or off of the trench.

The handle bar 1 of the preferred embodiment of the present invention further comprises a first handle member 2, a first gripping sleeve 3, a second handle member 4, and a second gripping sleeve 5, which is illustrated in FIG. 6. The first handle member 2 and the second handle member 4 both allow a user's hands to grasp the present invention and move the present invention in any direction the user desires. Consequently, the steel plate is moved in the given direction. The first gripping sleeve 3 and the second gripping sleeve 5 increase the friction between the user's grip and the first handle member 2 and the second handle member 4, respectively. The arrangement between the first handle member 2 and the second handle member 4 is such that the first handle member 2 and the second handle member 4 are diametrically opposed to each other about the electrically insulative shaft 10. This arrangement enhances the user's control of the present invention while guiding a steel plate onto or off of a trench. The first handle member 2 is encircled by the first gripping sleeve 3. Similarly, the second handle member 4 is encircled by the second gripping sleeve 5. More specifically, the first gripping sleeve 3 and the second gripping sleeve 5 are positioned opposite each other along the handle bar 1. The arrangement between the first handle member 2 and the first gripping sleeve 3 lessens the chances of the user's hand from slipping past the first handle member 2. Likewise, the arrangement between the second handle member 4 and the second gripping sleeve 5 lessens the chances of the user's opposite hand from slipping past the second handle member 4.

In order for the handle and the electrically insulative shaft 10 to freely pivot about the stator 19 and the magnetized rotor 22, the universal joint 15 comprises a clevis 16, a pin 17, and a tang 18. The clevis 16 retains the pin 17, allowing the tang 18 to rotate about the pin 17. The tang 18 is shown perpendicular to the clevis 16 in FIG. 1 and parallel to the clevis 16 in FIG. 3. More specifically, the tang 18 is mounted adjacent to the second shaft end 12, and the stator 19 is mounted adjacent to the clevis 16, offset the tang 18. The pin 17 is mounted across the clevis 16 so that the tang 18 does not slip past the distal ends of the pin 17. The tang 18 is rotatably connected about the pin 17 such that the electrically insulative shaft 10 and the stator 19 may freely pivot about the universal joint 15. The rotation of the tang 18 about the pin 17 allows for even more movement of the steel plate as it is lowered onto or raised up and away from the trench while the steel plate is attached to the present invention.

Figure 3:
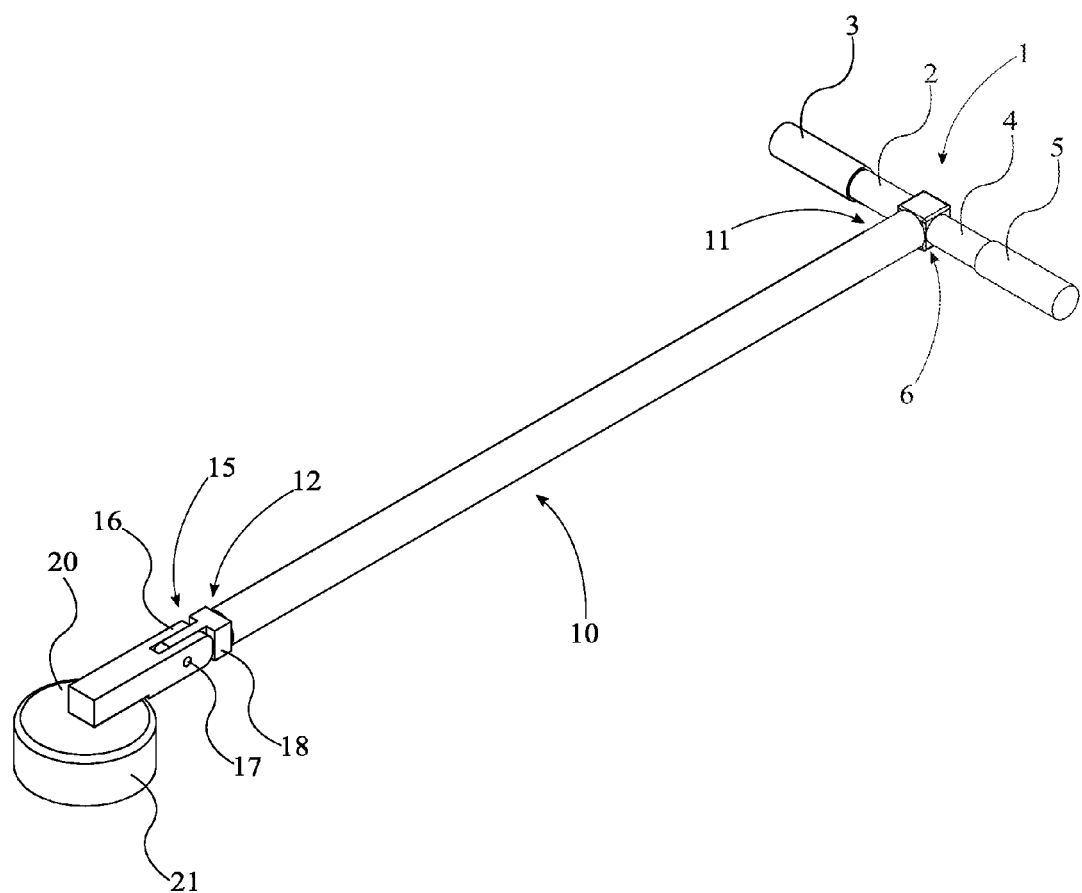
FIG. 3 is a perspective view of the preferred embodiment of the present invention in a prone orientation.
Figure 4:
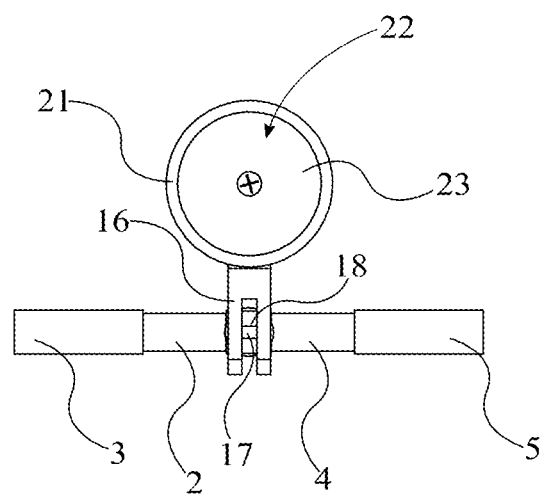
FIG. 4 is a bottom side view of the present invention, wherein the magnetized rotor is a single magnet.
Figure 5:
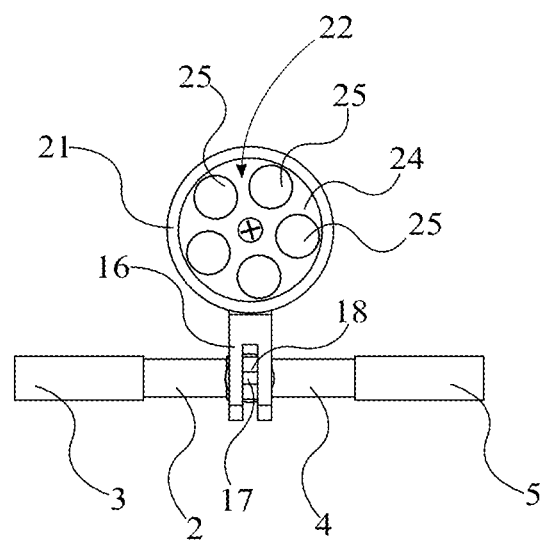
FIG. 5 is a bottom side view of the present invention, wherein the magnetized rotor comprises a molding and a plurality of magnets.

In the preferred embodiment of the present invention, the stator 19 comprises a base plate 20 and a tubular housing 21. The base plate 20 defines the structure of the tubular housing 21 and provides a mountable surface for the universal joint 15, as shown in FIG. 1, FIG. 2, and FIG. 3. The tubular housing 21 frames the magnetized rotor 22 and protects the magnetized rotor 22. The tubular housing 21 is positioned perpendicular to the base plate 20 and is perimetrically connected about the base plate 20. This arrangement effectively surrounds the magnetized rotor 22 and defines an open end of the tubular housing 21. The open end of the tubular housing 21 allows the magnetized rotor 22 that is housed within the stator 19 to attach to a steel plate. More specifically, the open end of the tubular housing 21 and the base plate 20 are positioned opposite each other along the tubular housing 21 so that the magnetized rotor 22 may press against a steel plate. Consequently, the magnetized rotor 22 is positioned adjacent to the base plate 20 and is encircled by the tubular housing 21. This arrangement allows the magnetized rotor 22 to spin freely within the tubular housing 21 as the magnetized rotor 22 attaches onto a steel plate. The magnetized rotor 22 is preferably a single magnet 23. The magnetized rotor 22 as a single magnet 23 is shown in FIG. 4. However, in another embodiment of the present invention, the magnetized rotor 22 may comprise a molding 24 and a plurality of magnets 25. The molding 24 houses the plurality of magnets 25 as the molding 24 spins within the stator 19 and the plurality of magnets 25 attaches the magnetized rotor 22 to the steel plate. The arrangement between the molding 24 and the plurality of magnets 25 is such that the plurality of magnets 25 is integrated into the molding 24 and is distributed through the molding 24. More specifically, the molding 24 is a disk, and the plurality of magnets 25 is radially distributed within the molding 24, as illustrated in FIG. 5.

In order for the stator 19 and magnetized rotor 22 to be connected to the handle bar 1 and to therefore be controlled by the user, the electrically insulative shaft 10 is preferably a single continuous shaft. The single continuous shaft provides a stronger electrically insulative shaft 10 and simplifies the manufacturing of the electrically insulative shaft 10 given a predetermined length. However, the distance between the user and a steel plate is not always known as the steel plate is lowered onto a trench. Therefore, in an alternate embodiment of the present invention, the electrically insulative shaft 10 comprises a first shaft member 13 and a second shaft member 14. This alternate embodiment is illustrated in FIG. 2. The first shaft member 13 and the second shaft member 14 accommodates the extend distance between the user and steel plate. The second shaft member 14 is preferably a solid fiberglass rod such that the electrically insulative shaft 10 remains electrically non-conductive while the first shaft member 13 may not necessarily be electrically non-conductive. The first shaft member 13 and the second shaft member 14 are telescopically engaged to each other, further accommodating the varied path of the steel plate onto the trench. In this alternate embodiment of the present invention, the first shaft end 11 is terminally positioned on the first shaft member 13, offset the second shaft member 14. Similarly, the second shaft end 12 is terminally positioned on the second shaft member 14, offset the first shaft member 13. The arrangement allows for more distance between the handle bar 1 and the stator 19 and the magnetized rotor 22.

Although the invention has been explained in relation to its preferred embodiment, it is to be understood that many other possible modifications and variations can be made without departing from the spirit and scope of the invention as hereinafter claimed.

What is claimed is:

1. A rigid magnetic tag line safety tool comprises:
   a handle bar;
   an electrically insulative shaft;
   a universal joint;
   a stator;
   a magnetized rotor;
   the electrically insulative shaft comprises a first shaft end and a second shaft end;
   the first shaft end and the second shaft end being positioned opposite each other along the electrically insulative shaft;
   the handle bar being positioned perpendicular to the electrically insulative shaft;
   the handle bar being mounted adjacent to the first shaft end;
   the stator being pivotably mounted to the second shaft end by the universal joint;
   the magnetized rotor being rotatably mounted to the stator;
   the electrically insulative shaft comprises a first shaft member and a second shaft member, the first shaft member being electrically conductive, the second shaft member being electrically non-conductive;
   the first shaft member and the second shaft member being telescopically engaged to each other;
   the first shaft end being terminally positioned on the first shaft member, offset the second shaft member; and
   the second shaft end being terminally positioned on the second shaft member, offset the first shaft member.

2. The rigid magnetic tag line safety tool as claimed in claim 1 comprises:
   a bar adapter;
   the bar adapter being detachably attached to the first shaft end; and
   the handle bar being centrally mounted through the bar adapter.

3. The rigid magnetic tag line safety tool as claimed in claim 2 comprises:
   the bar adapter comprises a cylindrical body, a bar hole, and a fastener;
   the bar hole laterally traversing through the cylindrical body; and
   the handle bar being positioned through the bar hole.

4. The rigid magnetic tag line safety tool as claimed in claim 1 comprises:
   the handle bar being rotatably mounted adjacent to the first shaft end.

5. The rigid magnetic tag line safety tool as claimed in claim 1 comprises:
   the handle bar comprises a first handle member, a first gripping sleeve, a second handle member, and a second gripping sleeve;
   the first handle member and the second handle member being diametrically opposed to each other about the electrically insulative shaft;
   the first handle member being encircled by the first gripping sleeve;
   the second handle member being encircled by the second gripping sleeve; and
   the first gripping sleeve and the second gripping sleeve being positioned opposite to each other along the handle bar.

6. The rigid magnetic tag line safety tool as claimed in claim 1 comprises:
   the universal joint comprises a clevis, a pin, and a tang;
   the tang being mounted adjacent to the second shaft end;
   the pin being mounted across the clevis;
   the tang being rotatably connected about the pin; and
   the stator being mounted adjacent to the clevis, offset from the tang.

7. The rigid magnetic tag line safety tool as claimed in claim 1 comprises:
   the stator comprises a base plate and a tubular housing;
   the tubular housing being positioned perpendicular to the base plate;
   the tubular housing being perimetrically connected about the base plate;
   an open end of the tubular housing and the base plate being positioned opposite to each other along the tubular housing;
   the magnetized rotor being positioned adjacent to the base plate; and
   the magnetized rotor being encircled by the tubular housing.

8. The rigid magnetic tag line safety tool as claimed in claim 1 comprises:
   the magnetized rotor being a single magnet.

9. The rigid magnetic tag line safety tool as claimed in claim 1 comprises:
   the magnetized rotor comprises a molding and a plurality of magnets;
   the plurality of magnets being integrated into the molding; and
   the plurality of magnets being distributed through the molding.

10. The rigid magnetic tag line safety tool as claimed in claim 9 comprises:
    the molding being a disk; and
    the plurality of magnets being radially distributed within the molding.

11. A rigid magnetic tag line safety tool comprises:
    a handle bar;
    an electrically insulative shaft;
    a universal joint;
    a stator;
    a magnetized rotor;
    the electrically insulative shaft comprises a first shaft end and a second shaft end;
    the first shaft end and the second shaft end being positioned opposite each other along the electrically insulative shaft;
    the handle bar being positioned perpendicular to the electrically insulative shaft;

the handle bar being mounted adjacent to the first shaft end;

the stator being pivotably mounted to the second shaft end by the universal joint;

the magnetized rotor being rotatably mounted to the stator;

the universal joint comprises a clevis, a pin, and a tang;

the tang being mounted adjacent to the second shaft end;

the pin being mounted across the clevis;

the tang being rotatably connected about the pin;

the stator being mounted adjacent to the clevis, offset from the tang;

the stator comprises a base plate and a tubular housing;

the tubular housing being positioned perpendicular to the base plate;

the tubular housing being perimetrically connected about the base plate;

an open end of the tubular housing and the base plate being positioned opposite to each other along the tubular housing;

the magnetized rotor being positioned adjacent to the base plate; and the magnetized rotor being encircled by the tubular housing.

12. The rigid magnetic tag line safety tool as claimed in claim 11 comprises:

a bar adapter;

the bar adapter being detachably attached to the first shaft end; and the handle bar being centrally mounted through the bar adapter;

the bar adapter comprises a cylindrical body, a bar hole, and a fastener;

the bar hole laterally traversing through the cylindrical body; and the handle bar being positioned through the bar hole.

13. The rigid magnetic tag line safety tool as claimed in claim 11 comprises:

the handle bar being rotatably mounted adjacent to the first shaft end.

14. The rigid magnetic tag line safety tool as claimed in claim 11 comprises:

the handle bar comprises a first handle member, a first gripping sleeve, a second handle member, and a second gripping sleeve;

the first handle member and the second handle member being diametrically opposed to each other about the electrically insulative shaft;

the first handle member being encircled by the first gripping sleeve;

the second handle member being encircled by the second gripping sleeve; and the first gripping sleeve and the second gripping sleeve being positioned opposite to each other along the handle bar.

15. The rigid magnetic tag line safety tool as claimed in claim 11 comprises:

the magnetized rotor being a single magnet.

16. The rigid magnetic tag line safety tool as claimed in claim 11 comprises:

the magnetized rotor comprises a molding and a plurality of magnets;

the plurality of magnets being integrated into the molding;

the plurality of magnets being distributed through the molding;

the molding being a disk; and the plurality of magnets being radially distributed within the molding.

17. The rigid magnetic tag line safety tool as claimed in claim 11 comprises:

the electrically insulative shaft being a single continuous shaft.

18. The rigid magnetic tag line safety tool as claimed in claim 11 comprises:

the electrically insulative shaft comprises a first shaft member and a second shaft member;

the first shaft member and the second shaft member being telescopically engaged to each other;

the first shaft end being terminally positioned on the first shaft member, offset the second shaft member; and the second shaft end being terminally positioned on the second shaft member, offset the first shaft member.

* * * * *